(12) United States Patent
Branham

(10) Patent No.: US 9,810,970 B2
(45) Date of Patent: Nov. 7, 2017

(54) LIGHT CONTAINMENT AND CONTROL DEVICE

(71) Applicant: Best Film Service Inc., Vancouver, BC (CA)

(72) Inventor: Michael James Branham, Vancouver (CA)

( * ) Notice: Subject to any disclaimer, the term of this patent is extended or adjusted under 35 U.S.C. 154(b) by 238 days.

(21) Appl. No.: 14/442,239

(22) PCT Filed: Nov. 12, 2013

(86) PCT No.: PCT/CA2013/000948
§ 371 (c)(1),
(2) Date: May 12, 2015

(87) PCT Pub. No.: WO2015/070311
PCT Pub. Date: May 21, 2015

(65) Prior Publication Data
US 2016/0291447 A1 Oct. 6, 2016

Related U.S. Application Data

(60) Provisional application No. 61/725,419, filed on Nov. 12, 2012.

(51) Int. Cl.
*G03B 15/06* (2006.01)
(52) U.S. Cl.
CPC .................. *G03B 15/06* (2013.01)

(58) Field of Classification Search
CPC .................. G03B 15/06; F21V 11/02–11/08
USPC .............. 362/3, 354, 16–18, 342; 442/2, 50, 442/185–186; 396/4; 359/591–598
See application file for complete search history.

(56) References Cited

U.S. PATENT DOCUMENTS

| | | | | |
|---|---|---|---|---|
| 2,942,254 A * | 6/1960 | Beers | ................. | H01J 29/185 348/834 |
| 3,628,007 A * | 12/1971 | Rosenberg | ............... | E06B 3/28 362/225 |
| 4,882,662 A * | 11/1989 | Prodell | ................. | F21V 11/06 362/290 |
| 8,014,654 B2 * | 9/2011 | Karle | ................. | F21V 17/06 396/4 |
| 8,579,654 B2 * | 11/2013 | Chen | .................. | H01R 12/61 439/267 |

* cited by examiner

*Primary Examiner* — Julie Bannan
(74) *Attorney, Agent, or Firm* — Stephen R. Burri; Island IP Law

(57) ABSTRACT

A light control device comprising a grid formed from a plurality of non-overlapping fabric ribbons positioned perpendicular to the plane defined by the grid; wherein the fabric ribbons define a plurality of one or more geometric cells within the grid for passage therethrough of light from a light source, the geometric cells preferably offset rows of rectangles when the device is unstressed, and hexagons when the device is undertension stretched evenly in line with the fabric ribbons of the grid.

3 Claims, 23 Drawing Sheets

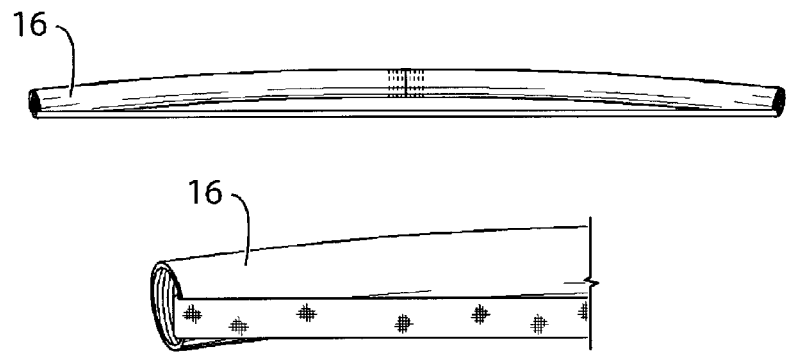
FIG. 14
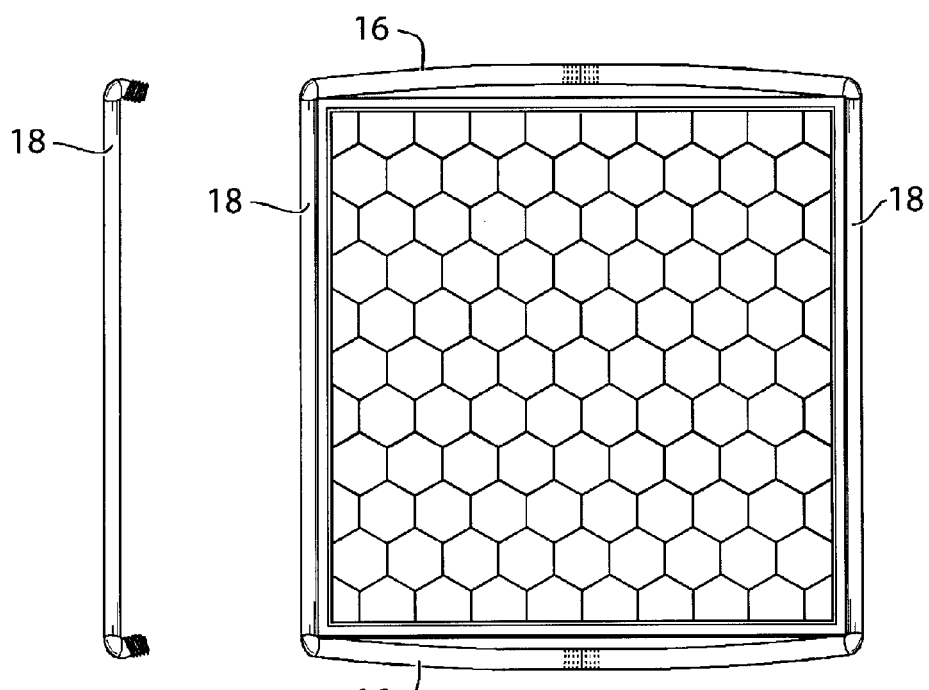
FIG. 15   FIG. 16

LIGHT CONTAINMENT AND CONTROL DEVICE

FIELD OF THE INVENTION

The present invention relates to lighting. In particular, the present invention relates to lighting and gripping technology in motion picture film making, cinematography and photography.

BACKGROUND OF THE INVENTION

When lighting for motion pictures, it is desirable to modify the light for a given shot to obtain a desired lighting effect which gives the film its "look" or aesthetic. Lighting configurations are used for the filming of images to create a scene in a film, as light is the fundamental agent of imprinting these images on the film or the digital camera sensor and on the viewer's eye. These configurations mostly involve the enhancing, creation, or modification of darkness in various ambient low light conditions, whether artificial or natural shadow in alleyways, or a night street rendered in a large film studio. These configurations also may include the manipulation and enhancement of light derived from a variety of light sources, which may be natural, artificial or a combination of both, such as a large spotlight on an actor playing a role in the Sonora Desert.

A scene in a motion picture is lit by adding, shining, or directing light onto the area that makes up the frame of the scene being filmed, the "shot". As indicated, lighting set-up may also involve taking light away from said frame or section of this area, or blocking light so it does not light the filmed space, which may be an actor who inhabits this filmed space. Taking select portions of light away from the area being filmed can be achieved by placing objects between the light source and the actor in the filmed space. This technique is known among cinematographers and photographers as "sculpting the light".

One way to sculpt light is to place a light diffusion device between the light source and the subject being filmed. The light diffusion device may be built from a rigid metal or fiberglass frame which holds a translucent fabric or plastic sheet varying in quality, color and opacity depending on the desired lighting result. These sundry diffusion devices soften the light in different ways, frequently making the light source less obvious. This is desirable, but if the lighting is soft throughout the entire field of view the shot may look too flat without definition.

Lighting set-ups on a film set will often involve refining and enhancing the light source to increase or decrease visual definition of the subject as well as the surrounding area of the depicted image by creating shadows for contrast of light intensity, depth of field, and suggestion of perspective. Whenever possible all levels of light quantity are controlled within the composed area seen by the cinematographer in each shot through the camera lens. This will create what the viewer eventually sees, whether it be on a cinema screen or a high definition monitor. Every image is lit using this technique so that each cinematographer or lighting director can achieve the desired image and scene, whether for film, video, art photography or theatrical lighting.

A typical movie-style lighting set-up will often begin with a large light fixture that produces what is known as a "hard light". The hard light often starts as a bare bulb and a convex mirror reflector that directs the light to pass through a glass lens, the lens often having a circular pattern. This type of lens is called a Fresnel lens. It has a pattern of concentric rings with varying angles that form the glass lens which focuses the initial beam of light at maximum intensity. A variety of other lens patterns are often used to change the spread of the light beam, but they reduce the intensity of the hard light, which is not always desirable.

A useful tool to enhance this hard light is an item known as a "fabric egg crate". A typical fabric egg crate is a single layer square grid formed of sets of continuous vertical and horizontal fabric strips. Commonly, the strips are manufactured of a flexible material such as polyester ribbon. These fabric strips intersect perpendicularly. An egg crate used for lighting is invariably patterned in this standard grid.

A light source passes through this plurality of square or rectangular cells, creating a soft wash of light that lies upon the filmed space. The usual cell depth is 3" but cell widths, and thus cell volumes, may vary depending on desired effect. Prior art fabric egg crate devices are commonly referred to as 50 degrees, 40 degrees and 30 degrees. For example, a 50 degree egg crate has dimensions of 3.59" wide×3.59" long× 3" deep. The "degree" refers to the angle at which the diffused light will project or "fall off" into darkness after it passes through the egg crate. Light traveling in a straight line through the egg crate will reach the subject, while light that is spilling into the peripheral fields will be cut out of the image, hence "sculpting the light". While square and rectangular cells in egg crates designed for the specific purpose described above result in loss of light intensity, which is not always desirable, such prior art egg crates have been accepted among light directors and cinematographers as the best available option for the application described above, as no other designs have been available. The only prior art designs manufactured for film industry use provide continuous vertical and horizontal strips of malleable fabric that form a uniform standard four-sided cell grid.

SUMMARY OF THE INVENTION

There is provided a light control device comprising a grid formed from a plurality of fabric strips positioned perpendicular to the plane defined by the grid; wherein the fabric ribbons define a plurality of one or more geometric cells within the grid for passage therethrough of light from a light source.

The light control device may further comprise a rigid frame attached to the perimeter of the grid. The geometric cells may be offset rows of rectangles when the device is unstressed, and hexagons when the device is stretched evenly in line with the fabric ribbons of the grid.

The flexible fabric ribbons may increase in width from one edge of the grid to the opposing edge of the grid, or they may increase in width from the centre of the grid to the perimeter of the grid.

The flexible fabric ribbon may be between 0.5" and 3' wide, or more preferably 1" and 4" wide. The geometric cells may be concentric divided hexagons, or may be alternating rows of hexagons and bisected hexagons.

The light control device may further comprise a circular tube attached to each outside corner of the frame, and a plurality of opaque plugs having shapes corresponding to the geometric cells of the grid.

The grid may instead be formed from a plurality of fabric ribbons positioned non-perpendicular to the plane defined by the grid; wherein the fabric ribbons define a plurality of one or more geometric cells within the grid for passage therethrough of light from a light source. The surface area at one open end of each geometric cell may be greater than the surface area at the opposing open end of the geometric cell. The cell walls of each geometric cell may be non-parallel.

There is also provided a method of manufacture of a flexible fabric light control device comprising the steps of marking a plurality of rolls of fabric ribbon with evenly spaced parallel sewing lines traversing the width of the ribbon; cutting a plurality of linkage segments from another roll of ribbon; and sewing each end of a linkage segment to corresponding sewing lines on adjacent parallel rolls of fabric ribbon to form a grid.

BRIEF DESCRIPTION OF THE DRAWINGS

The present invention will be described in further detail in accordance with the following drawings where:

FIG. 14 depicts expanding tubes for Velcro attachment to a frame to hold the fabric grid taut within a soft box;

FIG. 15 depicts an expanding tube frame sides insert;

FIG. 16 depicts an expanding tube frame in assembled form;

Figure 1:
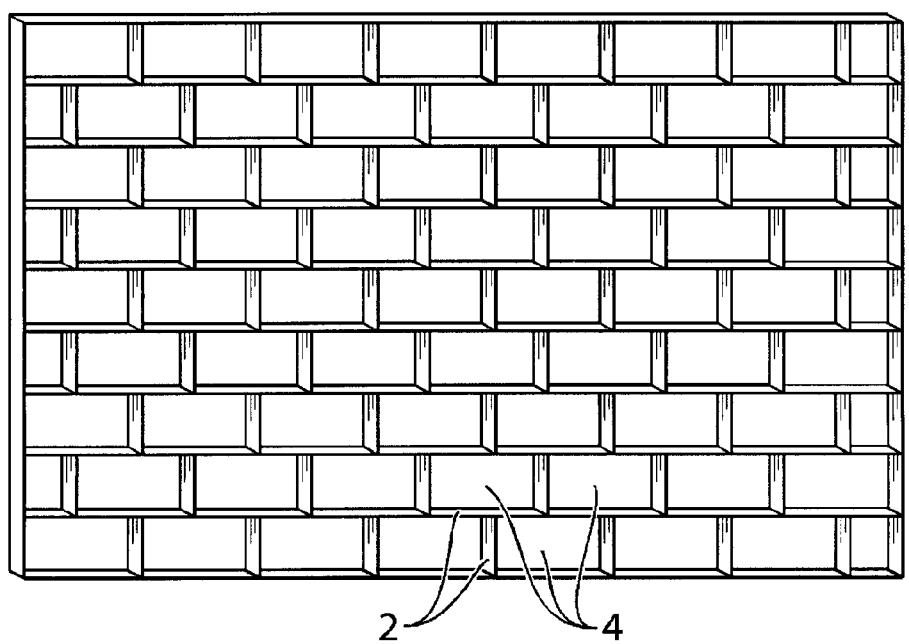
FIG. 1 depicts a perspective view of one embodiment of the present invention in a non-stretched position, showing offset rows of rectangular cells.
Figure 2:
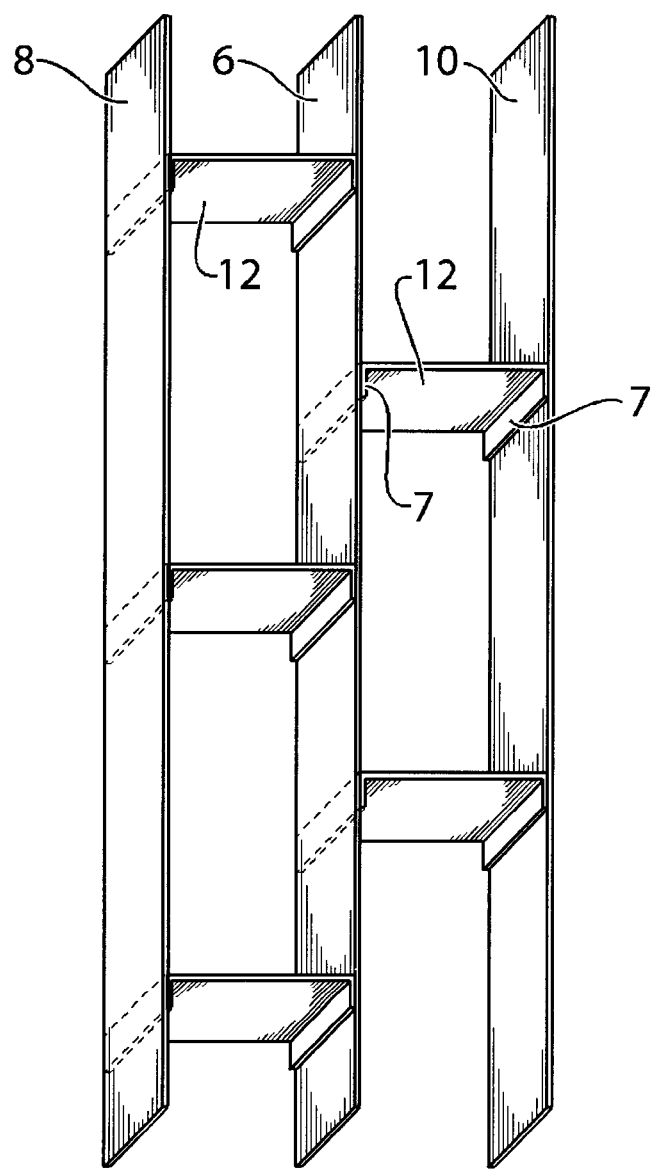
FIG. 2 depicts a perspective view of another embodiment of the present invention in which all salvage tabs have the same orientation.
Figure 3:
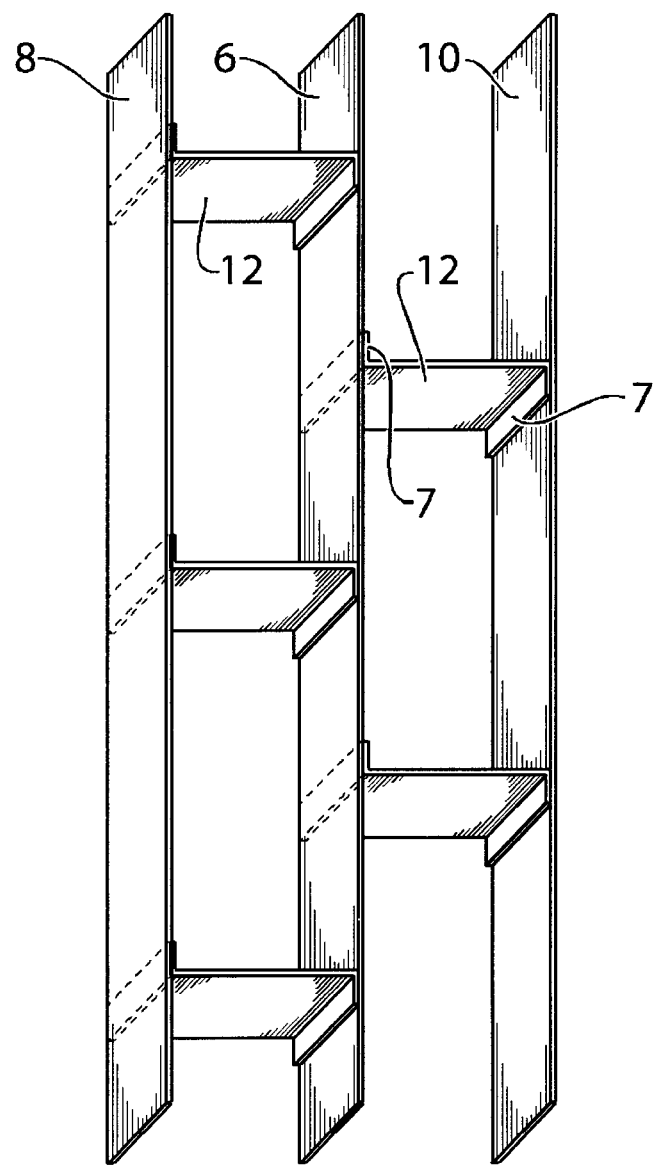
FIG. 3 depicts a perspective view of another embodiment of the present invention in which salvage tabs on each end of each short fabric element have opposite orientation.
Figure 4:
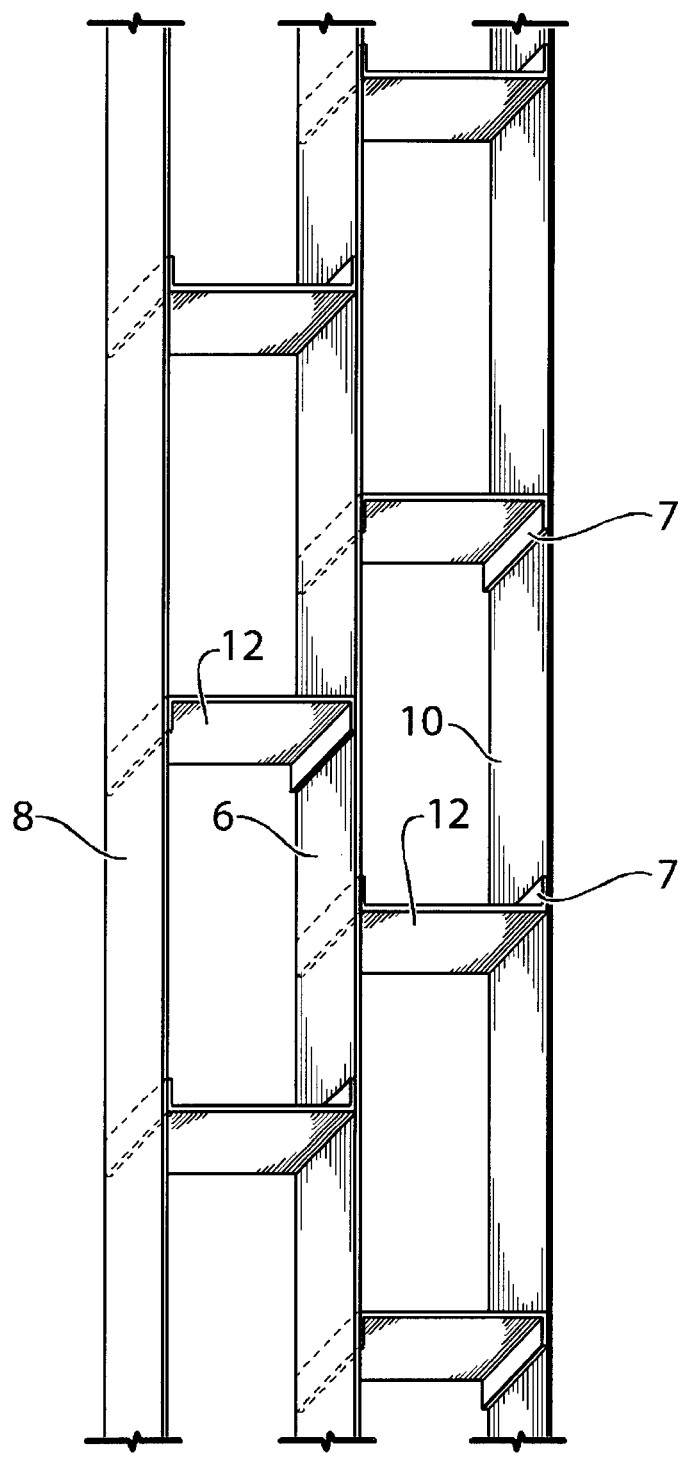
FIG. 4 depicts a perspective view of another embodiment of the present invention in which salvage tabs on each end of each short fabric element have the same orientation, but opposite orientation to each adjacent short fabric element.
Figure 5:
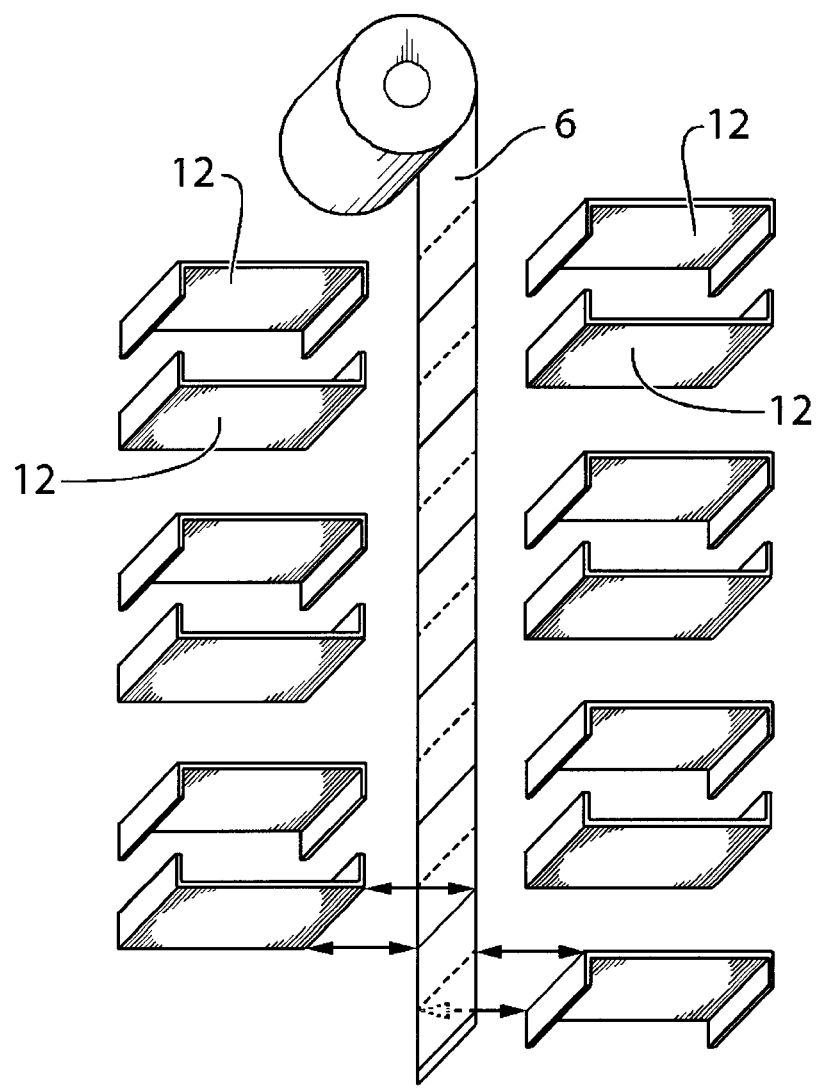
FIG. 5 depicts a perspective view of a roll of ribbon with sewing lines marked at even intervals where the adjacent pieces of fabric are to be attached to construct a non-standard grid with both salvage tabs of the adjacent fabric facing the same way to create the fabric grid depicted in FIG. 4.
Figure 6:
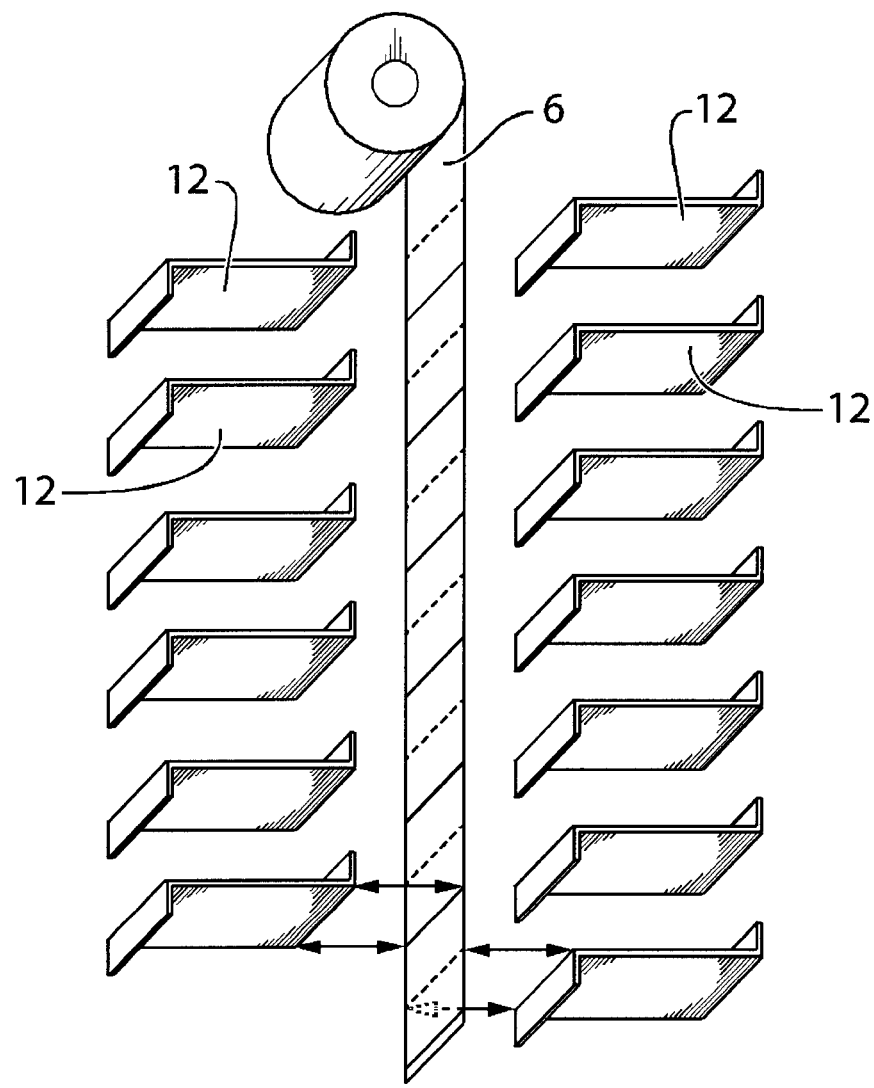
FIG. 6 depicts a perspective view of a roll of ribbon with sewing lines marked at even intervals where the adjacent pieces of fabric are to be attached to construct a non-standard grid with salvage tabs of the adjacent fabric facing opposing directions to create the fabric grid depicted in FIG. 3.

Selected embodiments of the invention are illustrated in the drawings by way of citations in the text. It is to be expressly understood that the description and drawings are only for the purpose of illustration and as an aid to further clarify the descriptive text of the present invention, and are not intended to limit the parameters and potential applications of the invention.

DETAILED DESCRIPTION OF THE INVENTION

As shown in FIGS. 1 through 4, the present invention is a fabric egg crate light containment and control device. Its structure is formed of a grid of hexagonal cells open at the front and back to permit light to pass through the grid. The fabric elements comprising the walls 2 of the cells 4 are sewn or woven from fabric, ribbon, or plastic sheeting. Other options for construction may include fabric welding whereby the material is melted, fused, or glued together. Preferably, the hexagonal cells of the present invention have opposing side-walls which are 2.5" apart and the cell walls are 3" deep. The dimensions of each cell and of the complete device may differ from one device to another. Cell dimensions may also vary within the same light control and containment device.

A hexagonal grid is "the best way to divide a surface into regions of equal area with the least total perimeter," as stated in the Honeycomb Conjecture, postulated at least as early as 36 BC and proven in 1999 by the American mathematician, Thomas Hale. By providing a fabric lighting grid with the least total perimeter of fabric cell walls, the maximum amount of light transmission is achieved with a hexagonal fabric grid. For a particular grid area, the hexagonal grid structure results in fabric cell walls which occupy less cross-sectional area than would fabric cell walls of equal thickness in a standard four-sided grid, such as is known in prior art available fabric egg crate designs.

In the present invention, a hexagonal grid form is achieved by first sewing the flexible fabric material into an offset rectangular or brick pattern grid, as depicted in FIG. 1. As depicted in FIGS. 2-6, such a non-standard rectangular grid may be formed with a plurality of parallel fabric strips 6 connected to adjacent fabric strips 8, 10 by shorter lengths 12 of the same fabric extending perpendicularly between the parallel strips. The shorter length fabric strips may have salvage tabs 7 all having the same orientation as in FIG. 2; each shorter length strip having salvage tabs of opposing orientation as in FIG. 3, or each shorter length strip having salvage tabs with the same orientation but opposing orientation to the salvage tabs of the adjacent shorter length strips as in FIG. 4.

Figure 7:
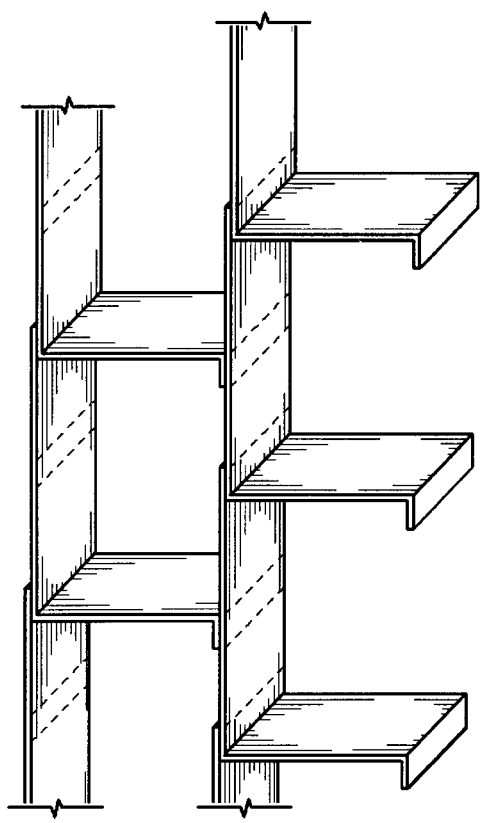
FIG. 7 depicts an alternate embodiment in which the fabric grid is manufactured of fabric strips all of the same length.

According to an alternate method of manufacture, the offset rectangular non-standard fabric grid may be manufactured by sewing together a plurality of fabric or other flexible material strips in the pattern depicted in FIG. 7, whereby each individual strip forms one long and one short side of each rectangular cell of the unstressed grid, which corresponds to three sides of the hexagonal cell in a tensioned grid.

Figure 8:
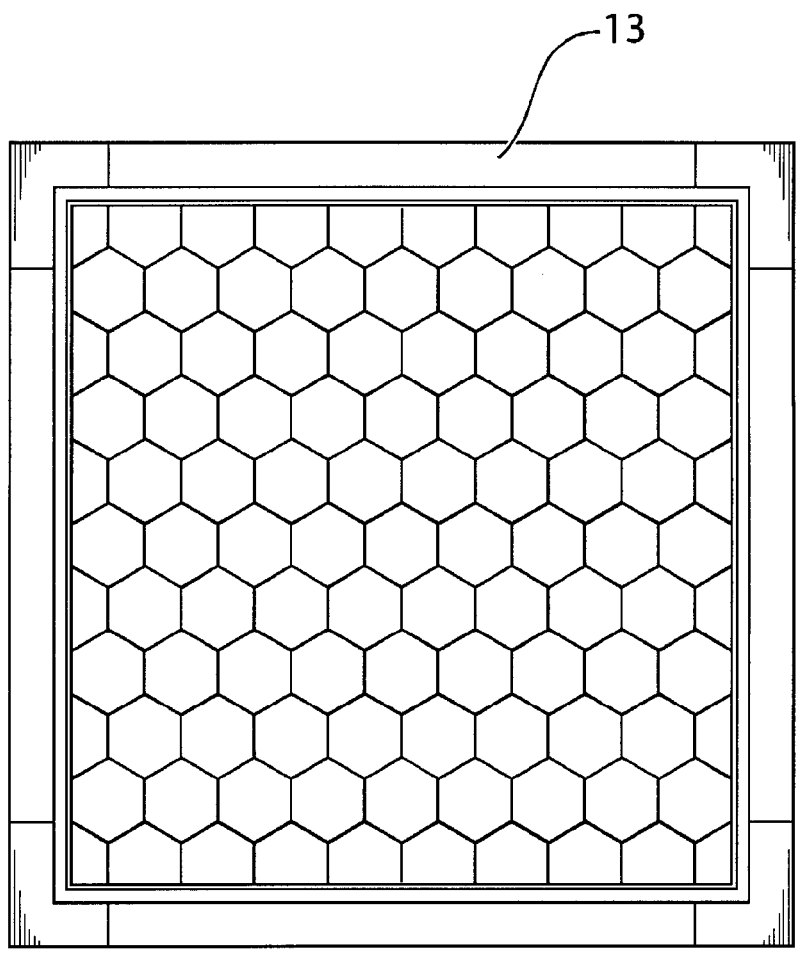
FIG. 8 depicts the fabric grid of the present invention stretched within a rigid frame to create hexagonal cells.

When equal outward tension is applied to all four sides of the perimeter of this non-standard rectangular grid, the grid geometry is transformed into atessellated hexagonal pattern, as shown in FIG. 8. The tensioned hexagonal grid may be held in its tensioned position by a rigid perimeter frame 13.

Figure 9:
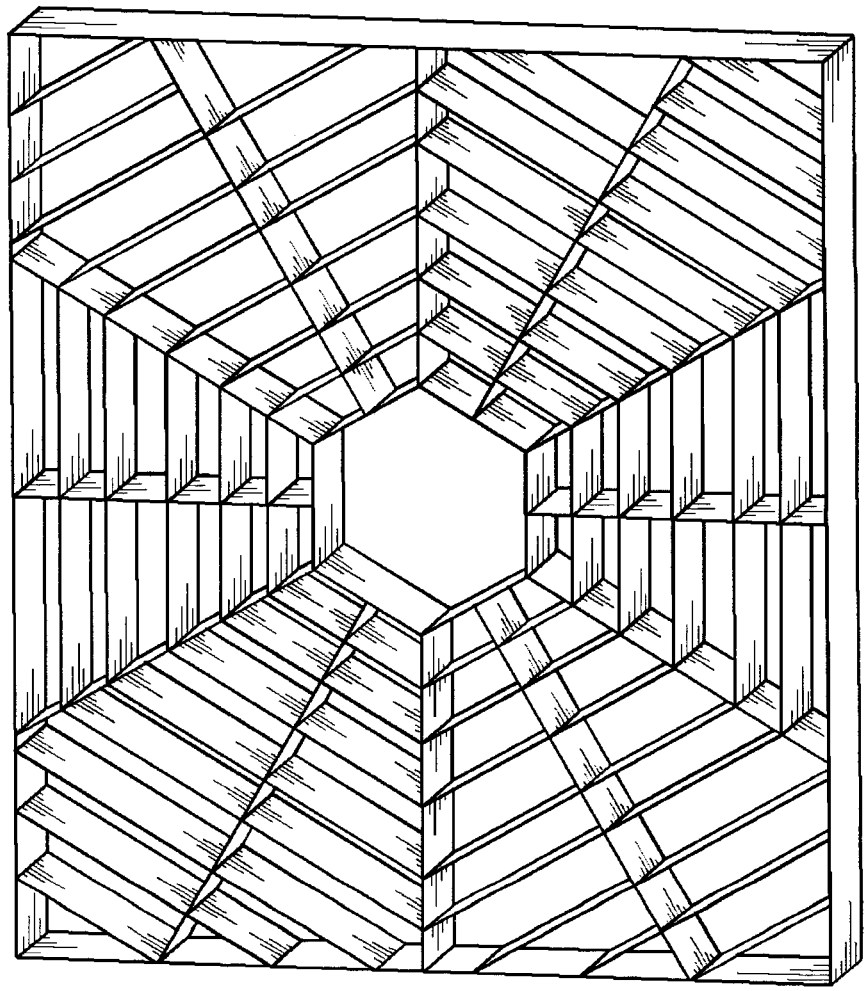
FIG. 9 depicts a perspective view of a fabric grid in which the fabric strips form concentric divided hexagons.

According to an alternate embodiment of the invention as depicted in FIG. 9, the device may be composed of a series of concentric hexagonal channels with each hexagonal channel being connected by one or more links to the next adjacent hexagonal channel or channels. In accordance with yet another embodiment of the present invention, the device may be composed of a series of concentric circular channels with each circular channel connected by one or more links to the next adjacent circular channel or channels. According to another embodiment of the present invention, the device may be composed of a series of concentric rectangular channels with each rectangular connected by one or more links to the next adjacent rectangular channel or channels.

Figure 10:
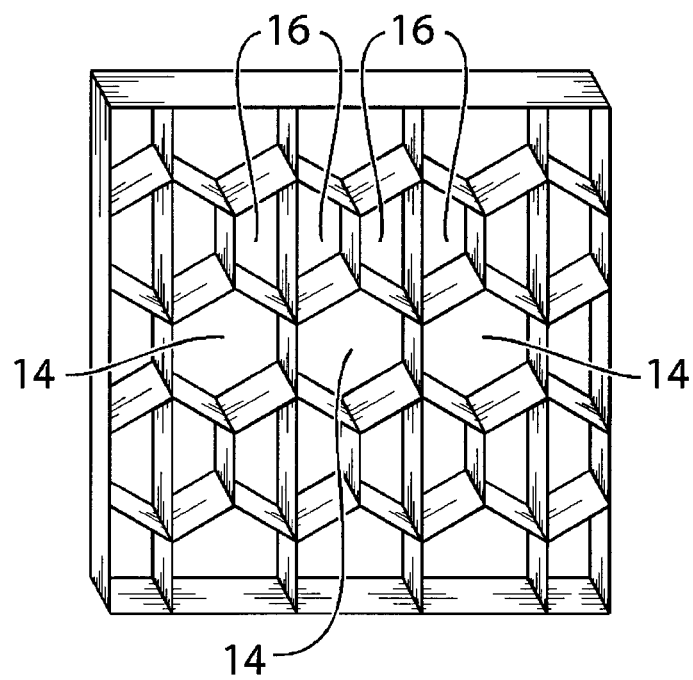
FIG. 10 depicts a perspective view of a fabric grid in which rows of hexagonal cells alternate with rows of bisected hexagonal cells.

According to another embodiment of the invention, the hexagonal cells of the device may be bisected, or the hexagonal grid may be composed of alternating regular 14 and bisected 16 cell channels, as demonstrated in FIG. 10.

Figure 11:
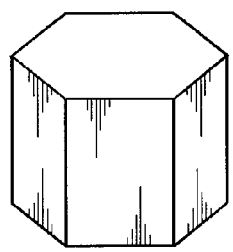
FIG. 11 depicts a perspective view of a three dimensional hexagon Styrofoam diffusion plug.

According to another embodiment shown in FIG. 11, three dimensional hexagon diffusion plugs made from Styrofoam may be incorporated into the device to permit more subtle alterations to the light passing through the device.

Figure 12:
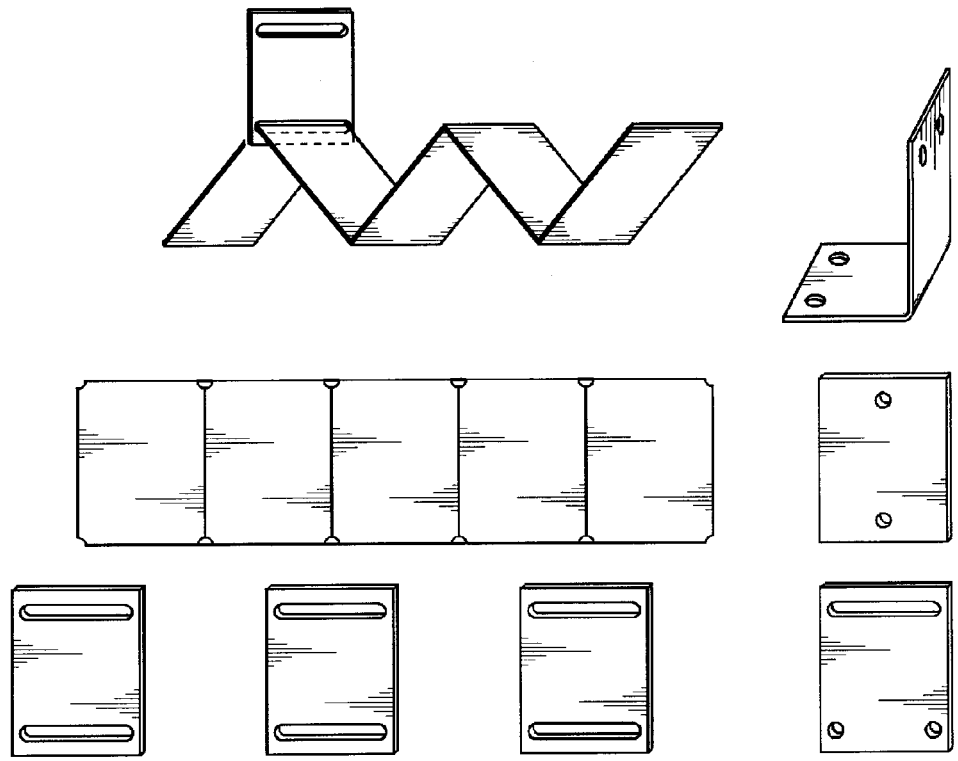
FIG. 12 depicts various unassembled components of the light control and containment device made from plastic sheeting and intended for a self-assembly kit version of the device intended to be put together by the end user.

According to another embodiment of the device depicted in FIG. 12, some or all its components may be prefabricated using rigid plastic sheeting and sold as a kit to the end-user for self-assembly.

Figure 13:
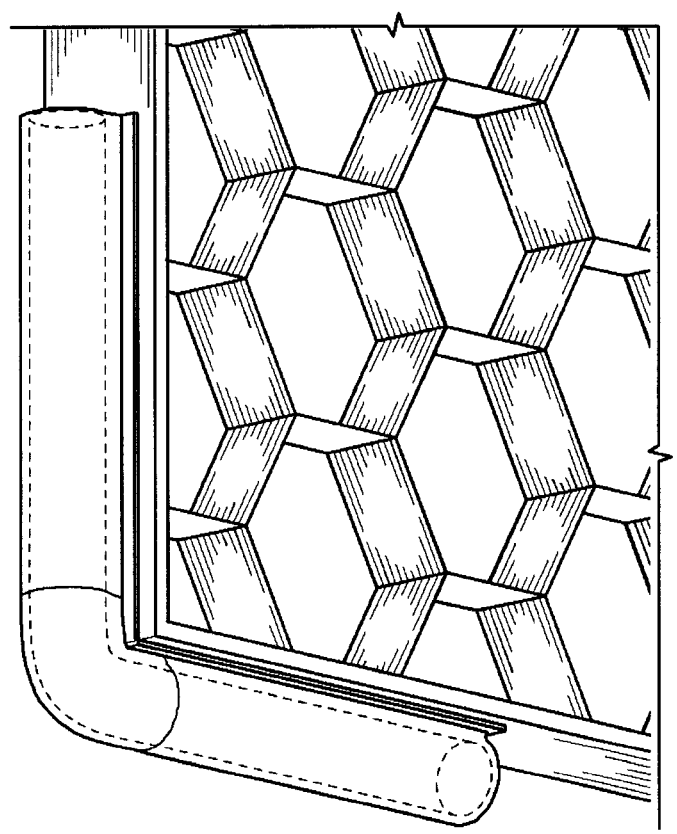
FIG. 13 depicts a close-up perspective view of 1" pipe sewn into the corners of the perimeter of the light control and containment device.

According to another embodiment shown in FIG. 13, corner brackets made of circular tubing preferably 1" in diameter may be sewn into the perimeter corners of the device, to allow the corners of the fabric grid to remain taut to allow proper light passage when attached to a frame.

According to yet another embodiment depicted in FIGS. 14-16, there is provided an expanding tube frame. The expanding tube frame is a lightweight collapsible frame which holds the fabric honeycomb grid through Velcro attachment taut in any soft box. As many soft boxes are very saggy they are unable to provide equal tension on all four sides of the frame and as a result a soft egg crate may sag causing the light to be de-focused. In order to maintain equal tension on all four sides, the expanding tube frame may serve as an adaptor for holding the fabric grid in a soft box. The expanding tube frame comprises top and bottom tubes 16 as depicted in FIG. 14, connectable with a pair of sides inserts 18 of the type depicted in FIG. 15 to form the frame around the fabric grid as shown in FIG. 16.

Each side of each hexagonal cell is composed of a single layer of the fabric material used for construction of the grid. This unitary layer feature is unlike the prior art of U.S. Pat. No. 8,014,654 ('654) which teaches a double layer of material required to achieve the hexagonal geometry. The use of a double layer of material restricts light transmission because a significant portion of the cell walls are thicker than the corresponding cell walls of the present invention. Moreover, the construction described in '654 increases the total weight of the hexagonal grid of the device, thereby increasing its deflection on any plane of use, unlike the present invention which will always be of lesser weight because its construction requires less material. Deflection refers to the sagging of the device when it is attached to its frame and placed at a downward angle or in a horizontal position in front of a light. Such deflection is undesirable as it alters the position of the fabric grid. Accordingly, the present invention provides a greater amount of control of the light than is possible with prior art devices.

Figure 17:
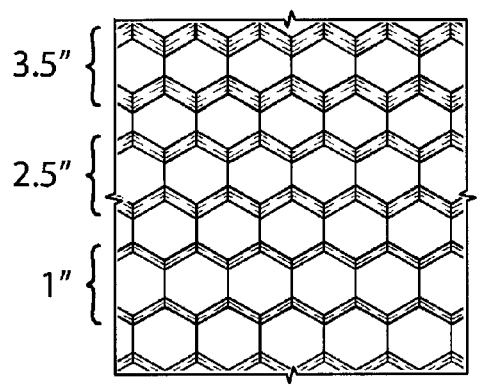
FIG. 17 depicts a perspective view of a unidirectional graduated device where fabric strips range in depth from one side of the device to the opposite side.
Figure 18:
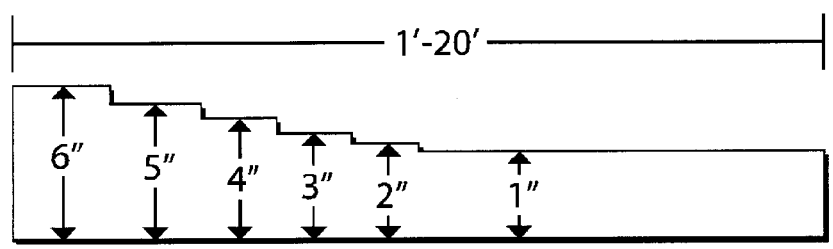
FIG. 18 depicts a cross-sectional view of another embodiment of a unidirectional graduated device.
Figure 19:
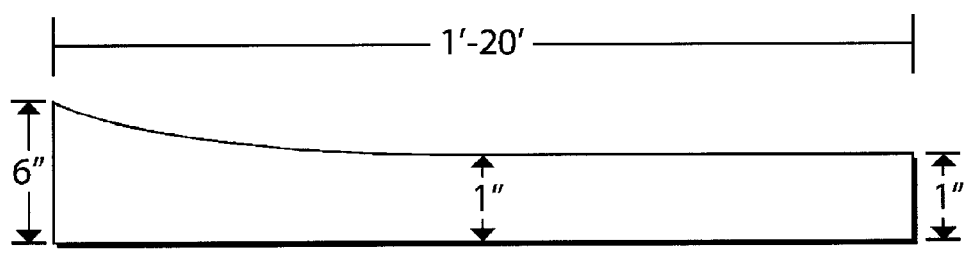
FIG. 19 depicts a cross-sectional view of yet another embodiment of a unidirectional graduated device.

In accordance with another embodiment of the present invention as depicted in FIG. 17, one edge of the fabric grid may have cell walls having a depth of 3.5", with adjacent cell walls decreasing in depth to the opposing edge which has cell walls having a depth of 1". FIG. 18 depicts a cross-sectional view of another embodiment in which the transition in cell wall depth is incremental in 1" increments from 6" to 1" from one edge to the opposing edge. FIG. 19 depicts a cross-sectional view of another embodiment in which the transition in cell wall depth is gradual from 6" at one edge to 1" at the opposing edge.

Figure 20:
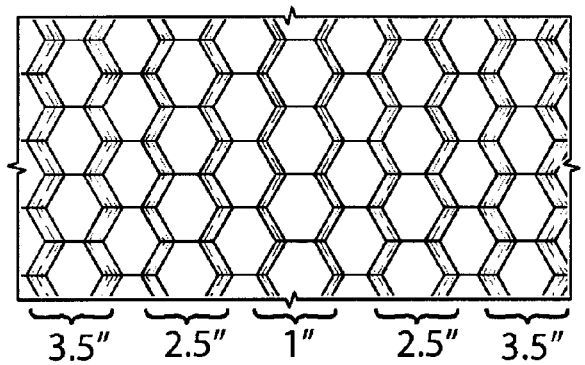
FIG. 20 depicts a perspective view of a bidirectional graduated device where fabric strips range in depth from the centre to opposing sides of the device.
Figure 21:
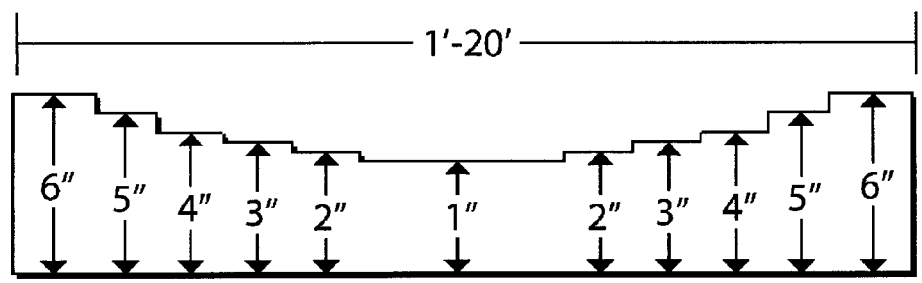
FIG. 21 depicts a cross-sectional view of another embodiment of a bidirectional graduated device.
Figure 22:
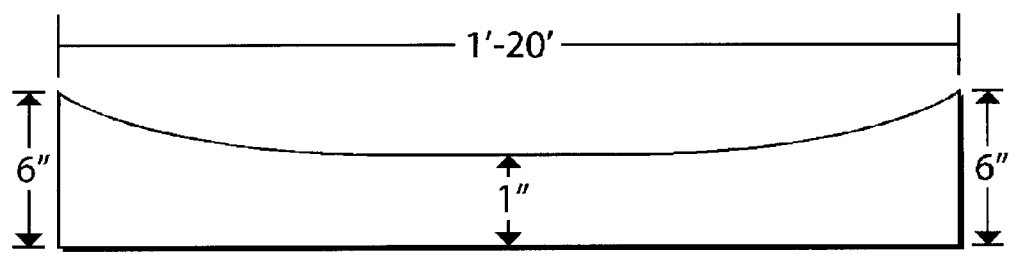
FIG. 22 depicts a cross-sectional view of still another embodiment of a bidirectional graduated device.

In accordance with another embodiment of the present invention as depicted in FIG. 20, the centre row of the fabric grid may have cell walls having a depth of 1", with adjacent cell walls on either side increasing in depth to the opposing edges which have cell walls having a depth of 3.5". Other cell wall depths are also within the scope of the invention. FIG. 21 depicts a cross-sectional view of another embodiment in which the transition in cell wall depth is incremental in 1" increments from 6" at opposing outer edges, to 1" for the centre row of cells. FIG. 22 depicts a cross-sectional view of another embodiment in which the transition in cell wall depth is gradual from 6" at the opposing edges to 1" at the centre row of cells.

Figure 23:
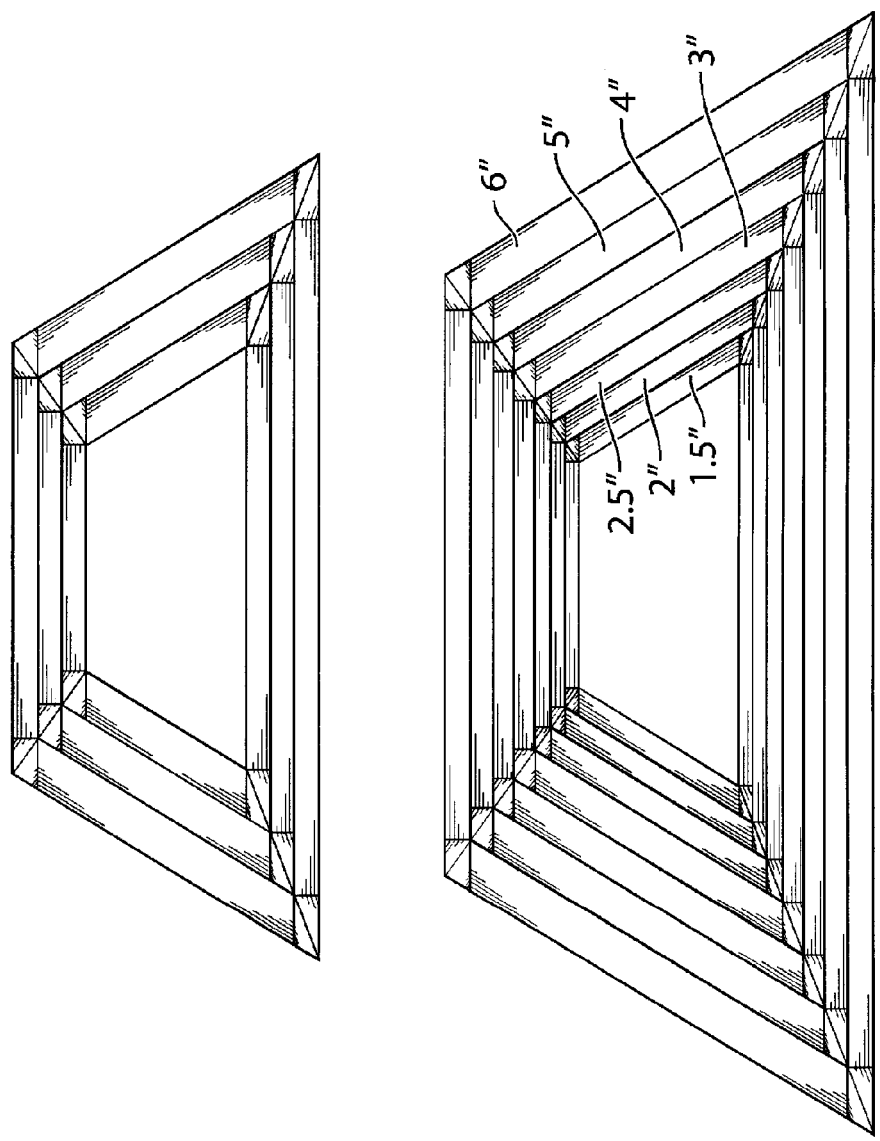
FIG. 23 depicts a perspective view of a concentric graduated device.

In accordance with another embodiment of the present invention, the device may be comprised of a series of concentric hexagonal, square, or circular channels, with cell walls that start with a depth of 2' on the perimeter and decrease in depth for each internally adjacent cell to finish with an innermost cell wall having a depth of 3" at the center of the geometric unit. Other starting and ending depths are also within the scope of the invention. These cell channel depths may vary in gradation from one size to the next and in individual dimension. Each said channel may be connected by one or more links to the next adjacent channel or channels depending on whether it is in within the interior of the grid or along the perimeter of the device. The links preferably are angled to form a transition between adjacent cell walls of differing depth. Another example of a similar embodiment is depicted in FIG. 23, in which the perimeter cell walls have a depth of 6" and each internally adjacent cell wall decreases in depth until the innermost wall has a depth of 1".

According to an alternate embodiment of the present invention, the device may be comprised of a series of concentric hexagonal, square, or circular channels with cell walls that begin at a depth of 3" on the perimeter and increase in depth to finish at a depth of 2' at the center of the geometric unit, thus manifesting the opposite gradation of channel dimension from the former embodiment. Other cell wall depths are also within the scope of the invention. These cell channel depths also may vary in gradation from one size to the next and in individual dimension.

According to a further embodiment of the present invention, each hexagonal channel may have three pairs of opposing side-walls that are spaced 3" apart and the cell walls having a depth of 3'.

Figure 24:
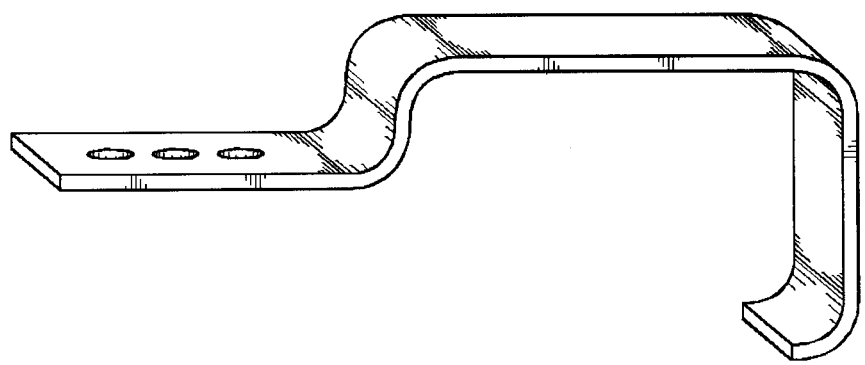
FIG. 24 depicts a J-clip.
Figure 25:
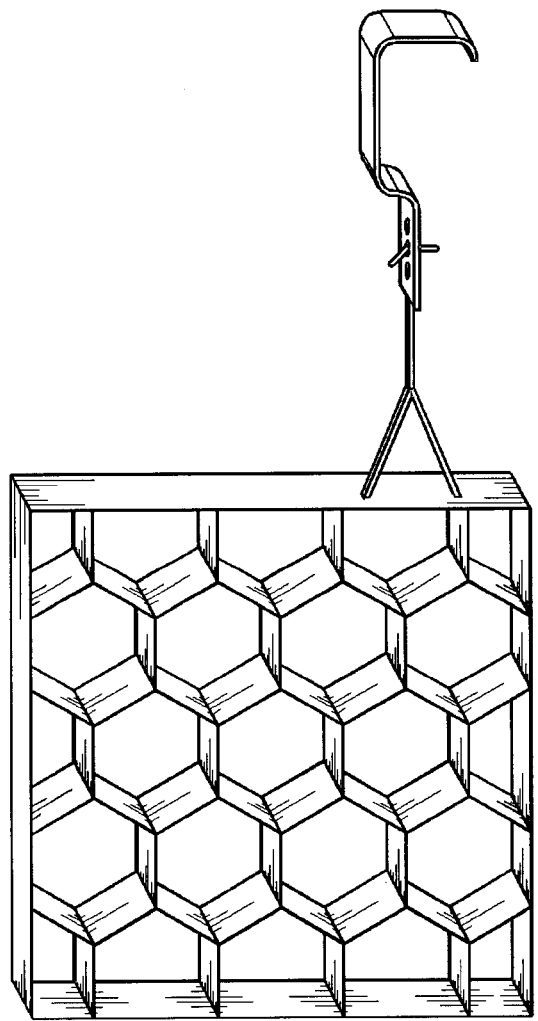
FIG. 25 depicts a J-clip attached to the perimeter of the light control and containment device by a cord.

According to another embodiment, the perimeter of the light control and containment device may be fitted with J-clips with either extendable or non-extendable cord ties to apply tension to the device. As depicted in FIGS. 24 and 25, each J-clip includes one or more openings at its linear end for attachment thereto of a cord for connection to a fabric grid frame. The one or more openings may be offset one from another to permit releasable locking of the cord. Other releasable cord locking means are also possible, such as through an opening in the linear end of the J-hook having a notch for snug insertion of the cord.

In accordance with another embodiment, the light containment and control device may be comprised of a plurality of alternating octagonal and square channels forming a grid. The presence of other geometric units forming the grid, in particular along the perimeter of the device, including irregular hexagons, pentagons and rhombi, is also understood to be within the scope of the present invention.

In a preferred embodiment of the present invention the light control and containment device may be manufactured using fabric such as ribbon for the internal grid structure, while the perimeter may be made from another such flexible material, ideally more robust than ribbon, such as vinyl or kevlar. Vinyl has sufficient strength for the perimeter portions of the present invention.

According to yet another embodiment of the present invention, the hexagons or other geometric shapes that are on the side facing the light source may be larger than the hexagons that are on the side of the device facing the subject or filmed space. In such embodiment, each hexagonal channel will taper slightly towards one open end. This embodiment will allow for the device to be used in opposing orientations, with either the A side or the B side facing the light source, so that different light beam angles can be achieved with the adjustment of a single device. Loss of light beam intensity passing through the hexagonal channels from the light aperture onto the subject may be reduced depending on what side of the device is being used.

According to another embodiment, the device may have Velcro sewn on the outside of its perimeter so it can be attached to a frame through Velcro attachment.

According to a further embodiment of the present invention, the fabric grid may be non-flexible. This rigid grid may be constructed of carbon fiber or fiberglass and impregnated with resin to render the grid inflexible.

Figure 26:
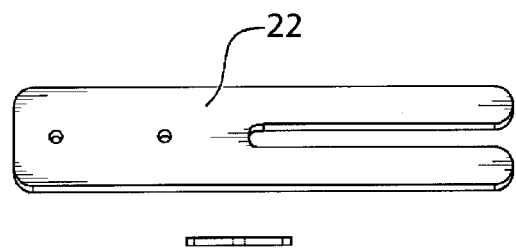
FIG. 26 depicts a stacking or fixture clip.
Figure 27:
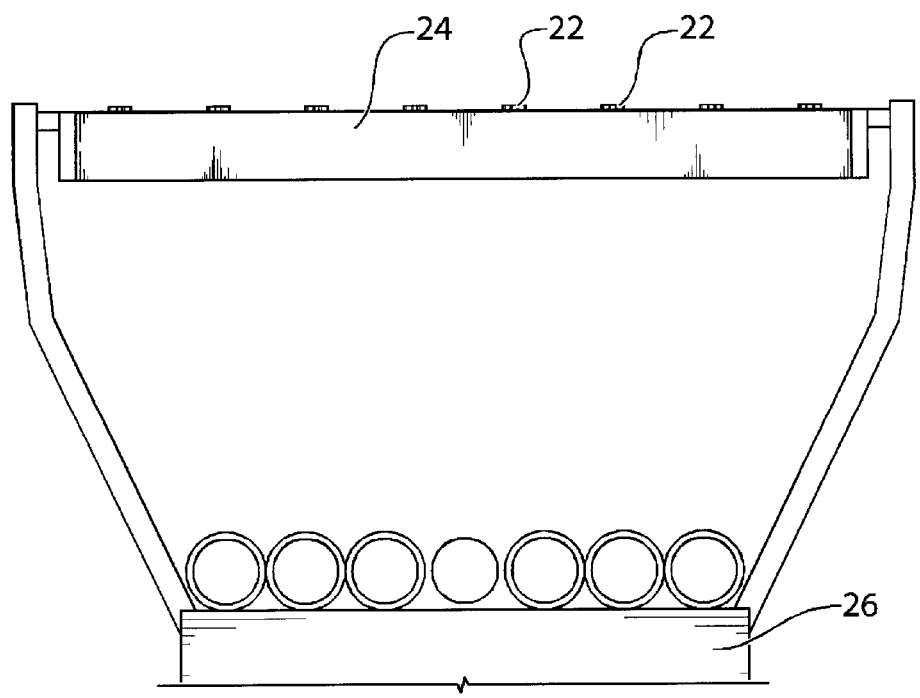
FIG. 27 depicts a fabric grid with several fixture clips attached.
Figure 28:
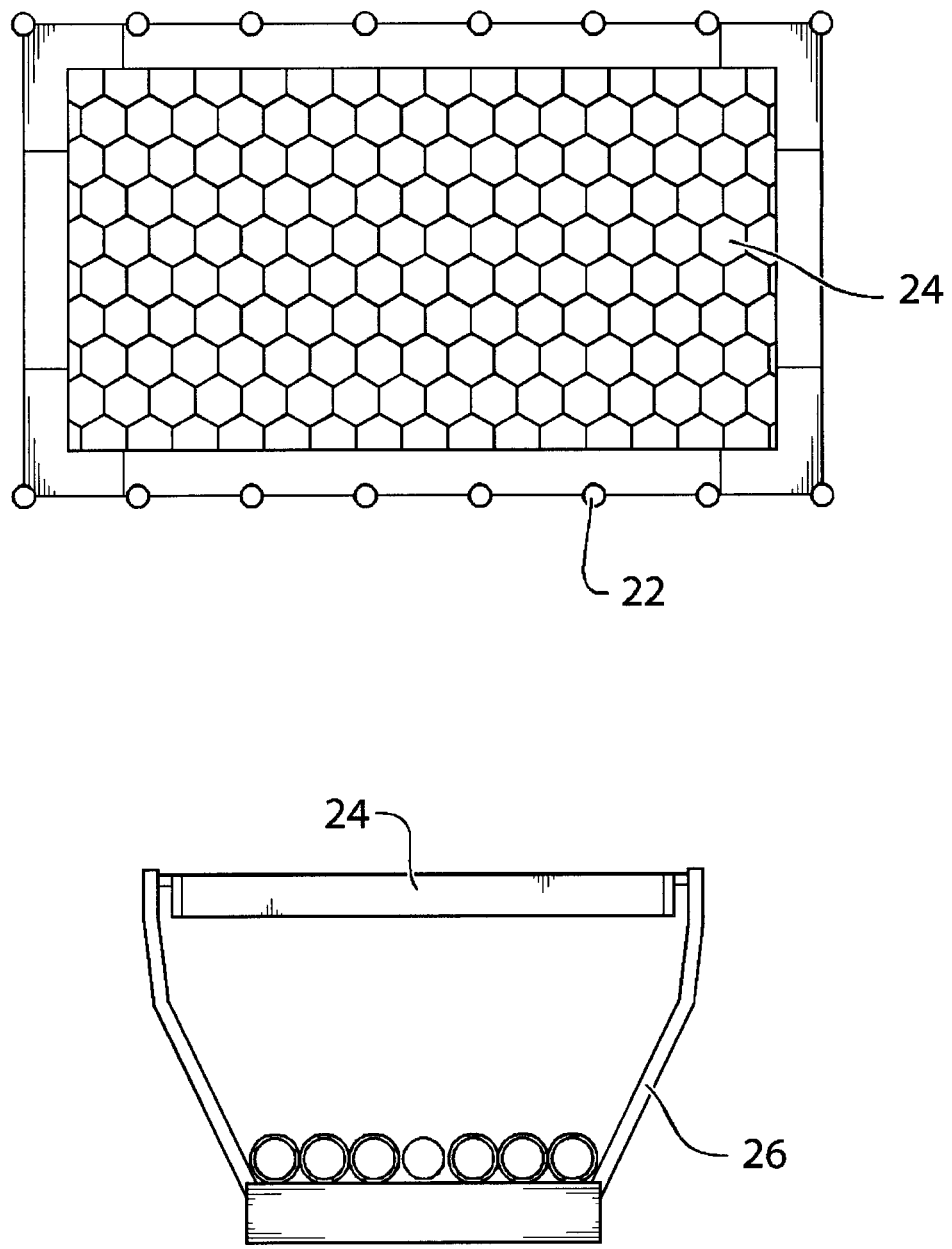
FIG. 28 depicts a fabric grid attached to a light fixture using several fixture clips.

According to an alternate embodiment of the invention, the device may be composed of an offset edging which permits the stacking of multiple light containment and control devices, one on top of the next. This allows for variance in the depth and dimensions of the cell channels that the light beam passes through. Such a technique will reduce the amount of light being transmitted through the device and will allow for different apertures to be combined by stacking to create a unique aperture option different from the apertures of any of the individual grids being used in combination. A clip 22 as depicted in FIG. 26 may be used to connect one grid to an adjacent overlaid grid. As shown in FIGS. 27 and 28, a plurality of such clips may be attached to a fabric grid 24 for releasable attachment of the grid to a light fixture 26.

Figure 29:
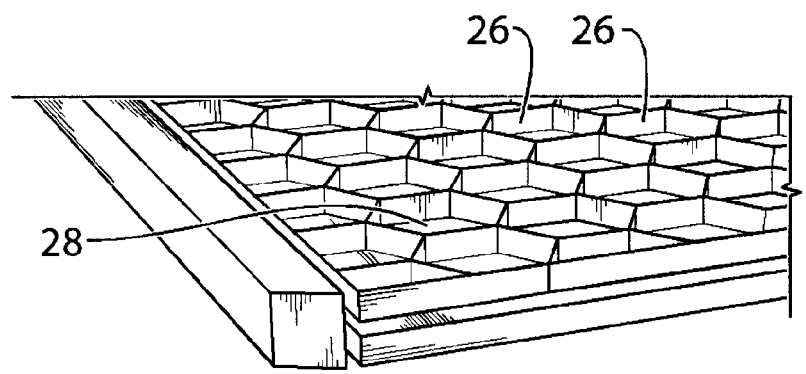
FIG. 29 depicts a perspective view of a second embodiment of the present invention which has a hexagonal grid form that is bisected depth-wise with a diffusion screen.

According to the embodiment of the invention depicted in FIG. 29, each of the hexagonal cells 26 of the fabric grid may be bisected with a diffusion screen 28.

Figure 30:
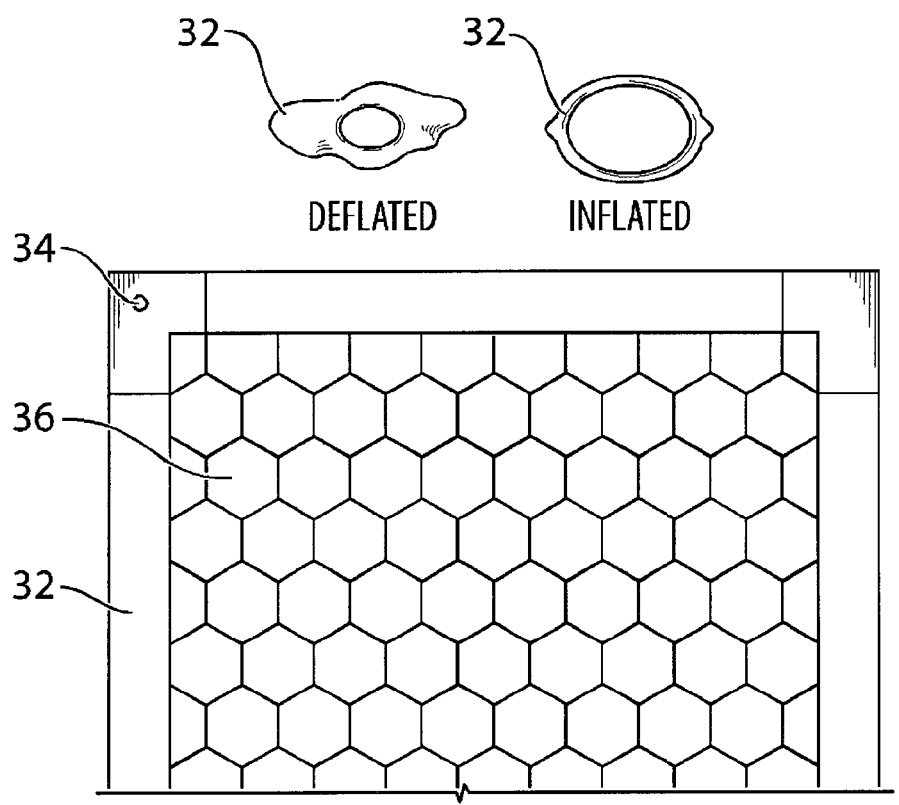
FIGS. 30 and 31 depict an inflatable frame.
Figure 31:
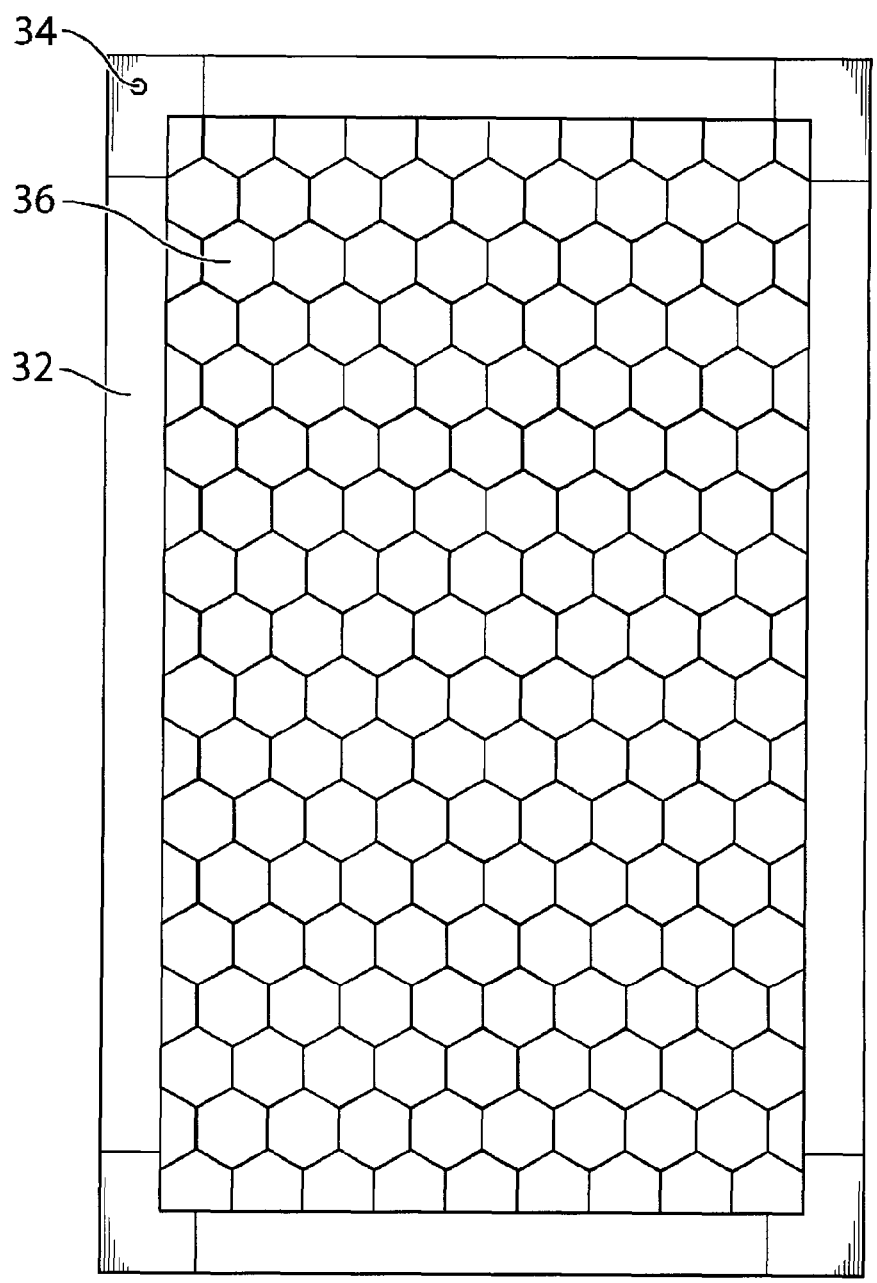
Figure 32:
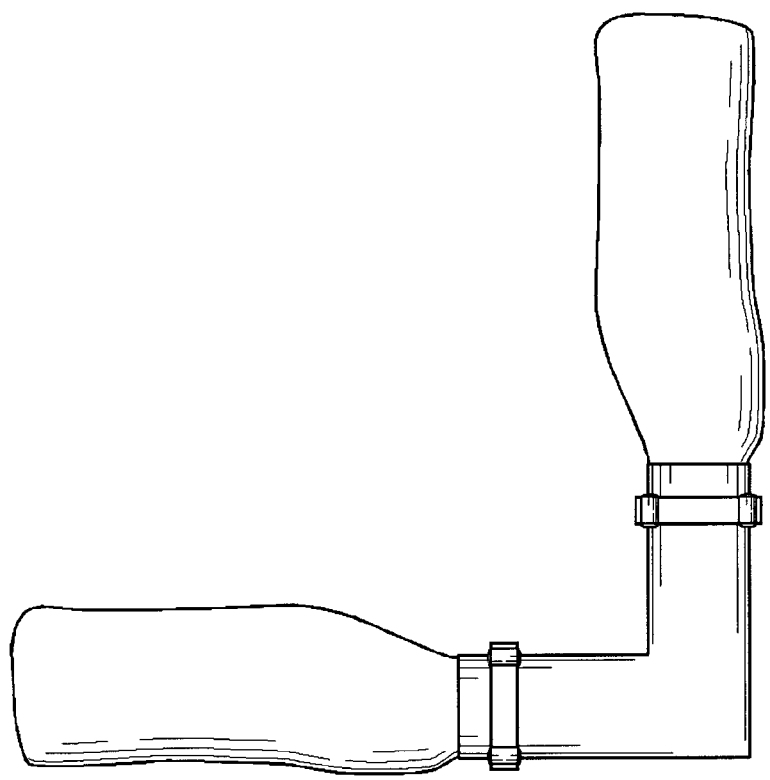
FIG. 32 depicts a rigid corner attachment for use with an inflatable frame.

Another embodiment may have an inflatable frame, which can be scaled up to larger sizes such as 2'×2', 12'×12', 20'×20', 30'×30', and 40'×40'. The inflatable frame embodiment is particularly useful for large frames as these would be difficult to transport and assemble if made from solid tubing. As seen in FIGS. 30 and 31, an inflatable web tube 32 having a filler valve 34 may be inflated to form a rigid frame internally supported by the fabric grid 36. In its deflated state, the tube is collapsible for ease of transport and storage. FIG. 32 shows a rigid corner attachment which may be used to form a right-angled frame corner for the inflatable frame.

Figure 33:
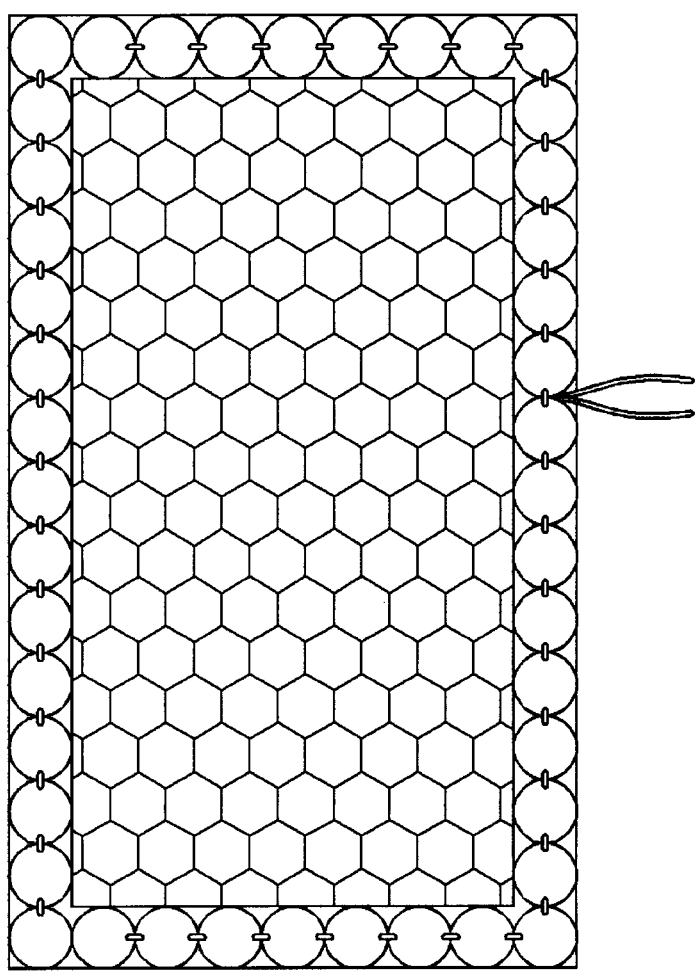
FIG. 33 depicts a beaded frame.

According to another embodiment depicted in FIG. 33, the grid may be held within a collapsible bead frame that is combined with the perimeter of the light control and containment device. The cylindrical beads may have alternating convex and concave ends which are threaded through with an elastic cord or a non-stretch cord that may be tightened with a tensioning apparatus. The beads of the beaded frame may be cylindrical or spherical ball joint connections to fit better end to end. The cord may be shock cord to allow rapid deployment of a collapsed frame into a rigid frame. A tensioner or winder may also be used to increase tension if necessary.

It will be appreciated by those skilled in the art that other variations of the preferred embodiment may also be practiced without departing from the scope of the invention.

What is claimed is:
1. A light control device comprising:
   a grid formed from a plurality of fabric ribbons positioned perpendicular to the plane defined by the grid; wherein the fabric ribbons define a plurality of one or more geometric cells within the grid for passage therethrough of light from a light source, wherein the geometric cells are alternating rows of hexagons and bisected hexagons.
2. A light control device comprising:
   a grid formed from a plurality of fabric ribbons positioned perpendicular to the plane defined by the grid; wherein the fabric ribbons define a plurality of one or more geometric cells within the grid for passage therethrough of light from a light source, further comprising a plurality of opaque plugs having shapes corresponding to the geometric cells of the grid.
3. A method of manufacture of a flexible fabric light control device comprising the steps of:
   a. marking a plurality of rolls of fabric ribbon with evenly spaced parallel sewing lines traversing the width of the ribbon;
   b. cutting a plurality of linkage segments from another roll of ribbon; and
   c. sewing each end of a linkage segment to corresponding sewing lines on adjacent parallel rolls of fabric ribbon to form a grid.

* * * * *